June 2, 1925.
W. HOLDSWORTH
GILL SCREW
Filed July 22, 1924
1,540,396
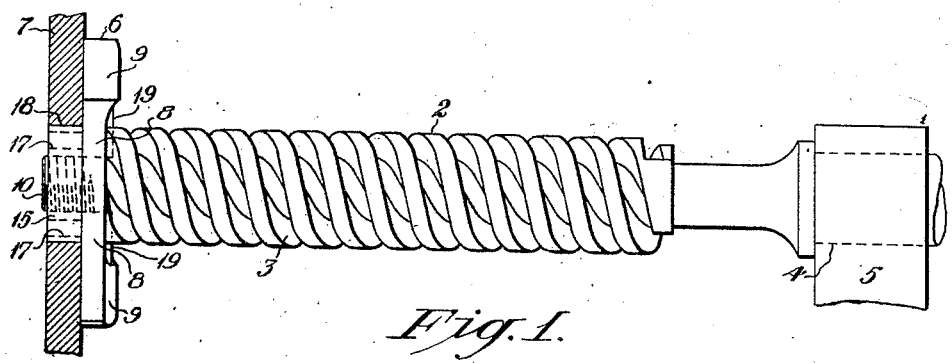
Fig. 1.
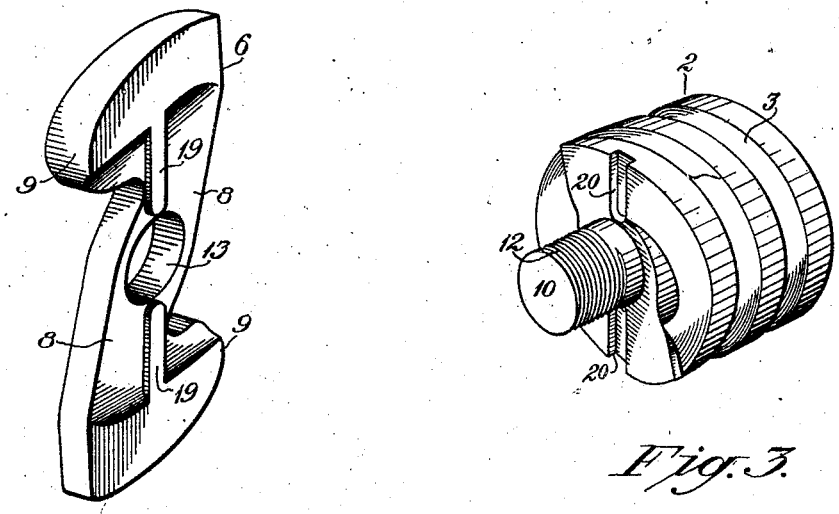
Fig. 2.
Fig. 3.
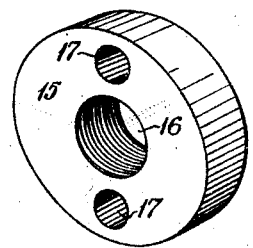
Fig. 4.
Inventor:
Willie Holdsworth
By
Attorneys.

Patented June 2, 1925.

1,540,396

UNITED STATES PATENT OFFICE.

WILLIE HOLDSWORTH, OF PROVIDENCE, RHODE ISLAND.

GILL SCREW.

Application filed July 22, 1924. Serial No. 727,457.

*To whom it may concern:*

Be it known that I, WILLIE HOLDSWORTH, a citizen of the United States, residing at Providence, in the county of Providence, State of Rhode Island, have invented certain new and useful Improvements in Gill Screws, of which the following is a specification.

This invention relates to gill-drawing frames and consists in improvements in the means for attaching the faller-cams to the gill-screws.

The principal object of the invention is to provide a simple and efficient means for fastening the faller-cam to the end of the screw and keying it in a definite relation to the threads thereof, whereby the cam-faces will assume the correct relation to the ends of the threads to properly transfer the faller-bars from one screw to another.

A particular object of the present improvement is to provide a keying or locking means formed on or applied to the cam itself to strengthen and reinforce the arms of the latter in the manner of a rib or projection; and which is received in a slot extending diametrically of the end of the screw across its maximum diameter.

Further objects of the improvement are set forth in the following specification which describes a preferred embodiment of the invention as illustrated in the accompanying drawings. In the drawings:

Fig. 1 is a side view of one of the gill-screws of the drawing frame showing it journaled in its bearings with the faller-cam attached at one end and secured rotatively therewith by means of my improved keying device;

Fig. 2 is a perspective view of the preferred form of the improved cam with its integral key;

Fig. 3 is a view in perspective of a portion of the gill-screw showing the key-slot or spline extending across the end of the threads of the screw; and Fig. 4 is a perspective view of the nut or collar which holds the cam in place on the screw.

Referring first to Fig. 1 of the drawings, 2 designates the top-screw of a gill-drawing frame which is formed with the usual double-pitch threads 3 and provided with a spindle-extension 4 at one end journaled in a main bearing 5. Mounted on the opposite or outer end of the screw 2 is the faller-cam 6 which acts on the gill-bars or fallers, not herein shown, to cause them to be transferred from the top-screws into the threads of the bottom-screws. As well known to those versed in the art the faller-bars slide on horizontal guides or saddles with their ends engaging the threads of opposite screws to cause them to be traversed therefrom. As the fallers reach the end of one set of screws, for instance the top-screws, they pass out of the thread-grooves and are acted on by the cams to carry them down into the threads of the bottom-screws which rotate in the opposite direction. Through this means the fallers are traveled back and forth in opposite directions with a continuous movement to cause them to comb the fibers passing through the machine.

In machines of this type as generally constructed the outer ends of the gill-screws are journaled in bearings in an upright end-plate 7 and the space available for the cam 6 is relatively narrow. The end-plate 7 acts as a guide for the faller-bars to direct them downwardly as they emerge from the threads of the top-screws 2, and the cam abuts the face of the plate to bring it into proper relation for its cam-surfaces to ride against the fallers. As illustrated in Fig. 2, the faller-cam 6 is usually constructed of flat bar stock with opposite radial arms 8 cut away at the sides to form rounded cam-noses 9 projecting laterally therefrom at their ends. The cam-noses 9 bear against the top of the gill-bars to carry them down into engagement with the threads of the bottom-screws, and it is obvious that the cam-faces must be set in certain definite relation with respect to the threads of the top-screws in order that they may engage the gill-bars or fallers immediately the latter emerge from the thread-grooves.

Projecting from the end of the top-screw 2 is an axial stud 10 of less diameter than the body of the screw and provided with screw-threads 12 on its periphery. At the center of the cam 6 is a hole 13 adapted to receive the stud 10 on the screw 2 to support the cam thereon. Any suitable means may be provided for fastening the cam in place on the stud 10, but I prefer to employ a cylindrical nut or collar 15 having an axial bore 16 which is interiorly threaded to engage the threads of the stud. The collar 15 is drilled with two or more holes 17 adapted to receive the prongs of a spanner-wrench by means of which it is screwed onto the stud 10 and set up against the outer face of the cam 6 to hold the latter firmly in position against the end of the screw 2. The collar 15 further serves as a trunnion or journal for the end of the screw 2, being adapted to turn in the bearing 18 of the end-plate 7 as illustrated in Fig. 1, thus economizing in space in accordance with the improvement set forth in my prior U. S. Letters Patent No. 1,394,829 dated October 25, 1921.

Various means have heretofore been used for holding the faller-cam rotatively with the screw 2 in definite relation with the ends of the threads thereof, the method most generally employed being to form flatted sides on the stud 10 with the hole in the cam shaped in conformity therewith. While this arrangement has been found fairly satisfactory in use it is open to certain disadvantages because it weakens the stud to some extent and is not as positive a lock or key as is required to resist the severe strain and stress to which the cams are subjected as they continually strike against the gill-bars. Furthermore, this previously used method of keying the cam to the screw affords no means for strengthening or reinforcing the cam itself which is necessarily relatively thin in cross-section at its center where it is bored to receive the stud 10. It has therefore been found in practice that the cam is frequently fractured or broken across the narrow section of its arms and when so damaged it must be replaced with a new cam. The cams require considerable accurate machining and careful finishing to adapt them to the purpose for which they are used and they are consequently expensive to manufacture. Moreover, when a cam is broken the gill-screw must be removed to replace it and this entails a considerable loss of time in which the machine is inoperative. It is therefore the principal object of the present improvement to provide a locking or keying means for the cam which will be stronger and more positive in its effect, and which instead of weakening the cam will tend to strengthen and reinforce it at the points where it is most liable to be broken.

To this end my invention consists essentially in providing raised ribs or "feathers" 19 extending radially along the arms 8 of the cam 6 at the points of narrowest cross-section; said ribs or keys being adapted to be received in slots or splines 20 cut into the end of the screw 2 and extending to the outer diameter of the enlarged threads thereof. It is to be particularly noted that the screw 2 is slotted across its end from its periphery clear to the periphery of the stud 10, thus providing an extended engagement with the keys 19 to render the lock most firm and substantial. As a result of this construction the rotative thrust of the screw 2 on the cam 6 is taken at a point at the maximum distance from the axis of rotation, whereby to insure a positive action with less strain on the weaker section of the cam. In other words, instead of driving the cam at a point adjacent its axis of rotation where the leverage thereon is increased and the strain augmented, the driving force is exerted at points adjacent the outer ends of the arms of the cam so that it is less liable to be ruptured or broken across its weakened section surrounding the stud 10 on which it is held.

The ribs or keys 19 on the arms 8 of the cam 6 are preferably constructed integral therewith by milling away the face of the cam, and through this construction the outer ends of the cam are left with thickened portions providing the maximum width of engaging face on the cam-noses 9. The cams are thus provided with relatively broad working-faces to render them capable of resisting the wear consequent upon their sliding contact on the gill-bars or fallers. Moreover, the keys 19 provide reinforcing ribs which strengthen the cam at its weakest points to prevent it from being broken or damaged under the force of the blows it strikes against the fallers, particularly when the latter become cramped or jammed in the threads of the screws.

While I have herein illustrated and described a preferred construction of my improved keying device with the keys formed integral with the cam, it is obvious that the structure may be modified, for instance by riveting or otherwise fastening separate keys to the cams. Other modifications may also be made in the arrangement and construction of the device without departing from the spirit and scope of the invention as defined by the appended claims.

What I claim is:

1. An improved gill-screw for gill-drawing frames formed with a cross-slot extending across its end, and a faller-cam fastened to the end of the screw and provided with a key on its face engaging the slot in the screw to secure the cam rotatively therewith in certain definite relation with respect to the threads thereof.

2. An improved gill-screw for gill-drawing frames provided with a transverse slot extending across its end, a faller-cam having radial arms with cam-projections thereon, means to fasten the cam to the end of the screw, and keys projecting from the arms of the cam along their length to engage the slot in the screw to lock the cam rotatively therewith.

3. The combination of a gill-screw provided with a slot extending across its end, a faller-cam having radial arms formed with integral reinforcing ribs projecting therefrom and adapted to engage the slot in the screw to key the cam rotatively therewith, and means for fastening the cam in place on the screw with its ribs seated in the slot.

4. An improved gill-screw for gill-drawing frames having peripheral threads and a reduced axial stud at its end with substantially radial slots cut into the end of the threads at the sides of the stud, a faller-cam formed with an axial hole for receiving the stud and having radial arms, and rib-like projections extending longitudinally of the arms of the cam to reinforce the same, said projections being adapted to be received in the slots in the end of the screw to key the cam rotatively therewith.

In testimony whereof I affix my signature.

WILLIE HOLDSWORTH.